Figure 1:
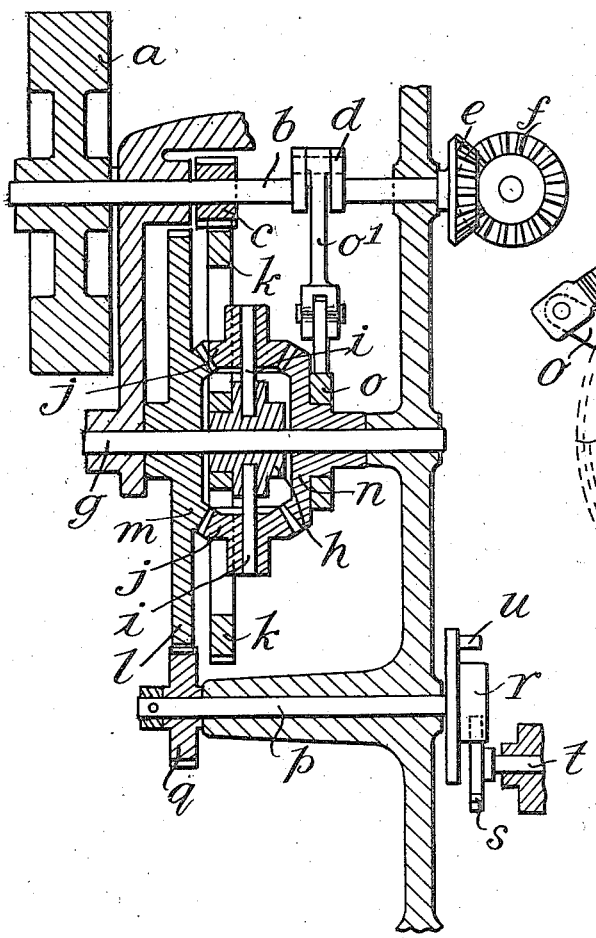

G. B. BOWELL.
FILM FEED GEARING.
APPLICATION FILED SEPT. 3, 1915.

1,160,970.

Patented Nov. 16, 1915.
3 SHEETS—SHEET 1.

Inventor:-
George Bennett Bowell
By:- B. Singer
Atty.

G. B. BOWELL.
FILM FEED GEARING.
APPLICATION FILED SEPT. 3, 1915.

1,160,970.

Patented Nov. 16, 1915.
3 SHEETS—SHEET 2.

Inventor:-
George Bennett Bowell
By: B. Singer
Atty.

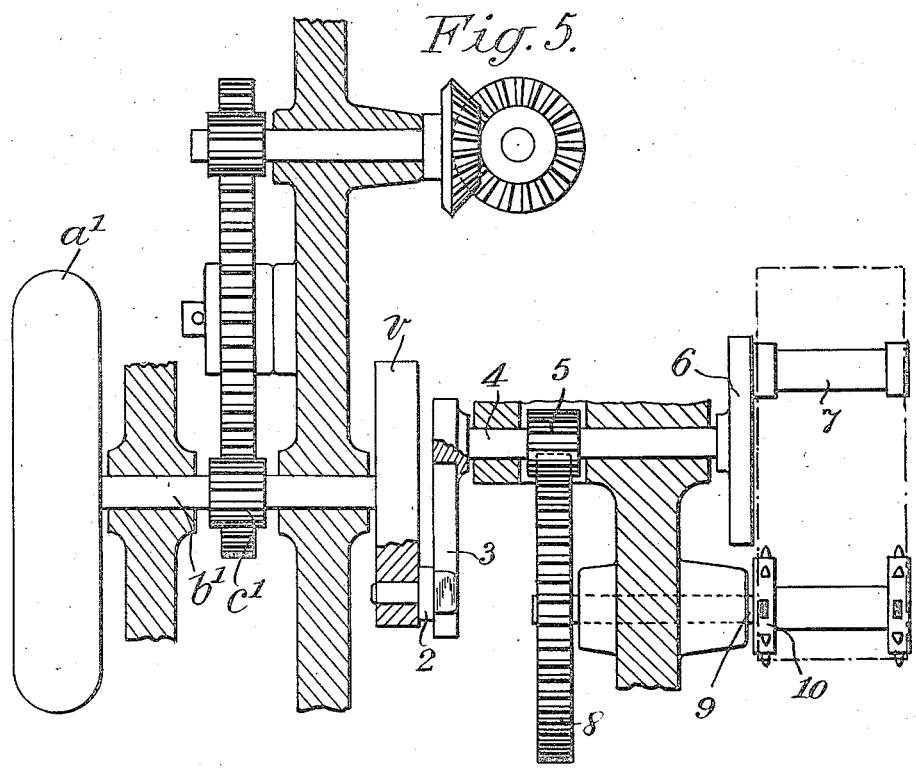
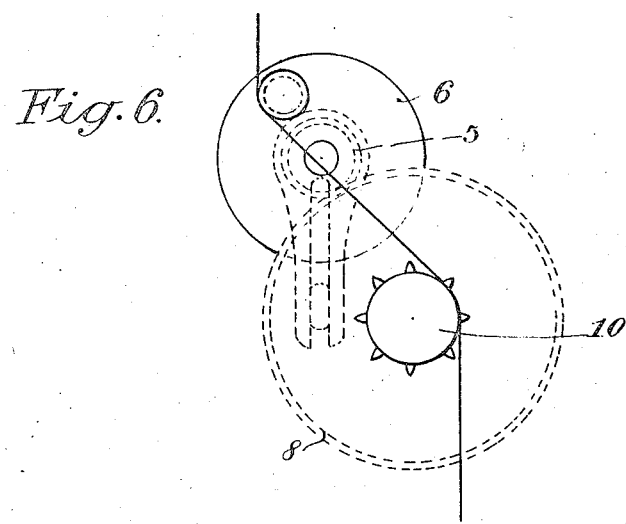

UNITED STATES PATENT OFFICE.

GEORGE BENNETT BOWELL, OF MARGATE, ENGLAND.

FILM-FEED GEARING.

1,160,970.　　　　　Specification of Letters Patent.　　Patented Nov. 16, 1915.

Application filed September 3, 1915.　Serial No. 48,917.

*To all whom it may concern:*

Be it known that I, GEORGE BENNETT BOWELL, a subject of the King of Great Britain and Ireland, residing at 31 Madeira road, Margate, Kent, England, have invented certain new and useful Improvements in Film-Feed Gearing, of which the following is a specification.

This invention relates to improvements in cinematograph projectors and has for its object the removal of eye tiring flicker by reducing the length of the picture changing period relative to the picture showing period.

With the same object in view, various methods have been suggested whereby the speed of the film actuating member is increased during the actual feed or picture changing period without affecting the fly wheel, shutter and other parts which rotate at constant speed.

One type of variable velocity gear consisting of a slotted crank arm and a crank pin on a rotating disk engaging therewith has been previously suggested for use with a claw or reciprocating film feeding device, but not so far as I am aware with the type of film feeding device to which my invention relates.

Now according to my invention, I provide an improved gear of the cyclically varying type which is distinguished from known constructions in that the members or member producing the intermittent feed action on the film consists of the usual locking ring and driving pin coöperating with a Maltese cross, or the usual rotary dog escapement constructed in the ordinary manner while the improved cyclically varying gear is so constructed that it can be interposed as a link between this detached feed action and the fly wheel spindle or shaft.

The film is driven when at its greatest speed at very nearly double the speed of the shutters, and there are four, five or even six shutters. By this arrangement the size of the shutters is reduced so that the total light efficiency for each picture is the same as with the three shutter arrangement and the high frequency of light impulses due to the increased number of shutters will eliminate or greatly reduce the usual flickering and give the appearance of an apparatus driven at double the usual speed.

For the sake of clearness but without binding myself to any particular construction to the exclusion of alternatives, I will describe in detail one way of carrying out the invention.

The film is driven by the usual Maltese cross device in which a feeding finger and locking ring are mounted on a spindle which is constantly rotating at a rate of one revolution for each picture, the Maltese cross being at rest except during ⅕ or ⅙ of a rotation of the feeding finger.

I provide a differential gear interposed between the usual fly wheel spindle and an additional spindle carrying the feeding finger and locking ring one member of this differential gear being cylindrically advanced and retarded by means of a crank on the fly wheel spindle, and in this way the feeding finger is made to travel through that part of its turn during which it is in engagement with the Maltese cross at approximately the same speed as if the projector were being run at double normal speed, but since the crank is turning in the opposite direction when the feeding finger is 180° distant from the center of the Maltese cross, its speed (the speed of the feeding finger) is during that part of its journey reduced to almost zero. In this way while retaining the excellent results attained by the characteristic of a "tangential" Maltese cross section, the whole period of engagement is halved and consequently the shutter blade multiple can be at once increased from 3 to 4, 5, or even 6 with the result that flicker is no longer existent of a sufficiently low frequency to be visible and eye tiring.

In an alternative construction the differential gear with its reciprocating member may be substituted by an eccentric toothed gear or the feeding finger may be driven at double speed and arranged to slide endwise out of engagement with the cross at alternative revolutions.

In another form of this invention the mechanism is of usual construction except that the Maltese cross device is driven by an eccentric gear or other similar cyclically variable gear and for the sake of clearness I will describe this gear in the form I have preference for, namely, the usual locking ring and feeding finger (which actuate the cross) is provided with a radially disposed slotted arm, and the fly-wheel which is eccentrically pivoted carries a crank pin as well as a pinion or bevel wheel by means of which it receives (or imparts) motion from the other moving parts of the mechanism, this crank pin is in this way made to drive the locking ring, the pin itself may be journaled in the crank and may have an extended bearing surface provided in the slotted arm, or the slotted arm may be the driver and the crank pin the driven part. The same device may be applied, if desired, to a projector mechanism of the "dog" form, in which case the circular motion of the dog is caused to have a cyclically variable speed.

The accompanying drawings illustrate three examples of the present invention.

Figure 2:
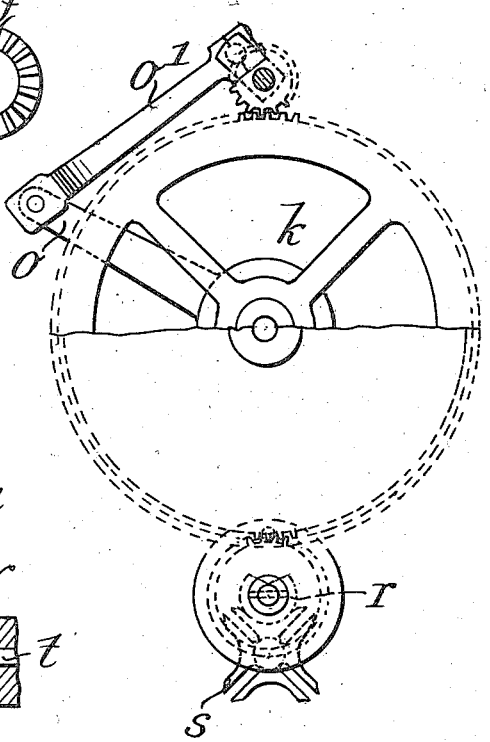
Figure 3:
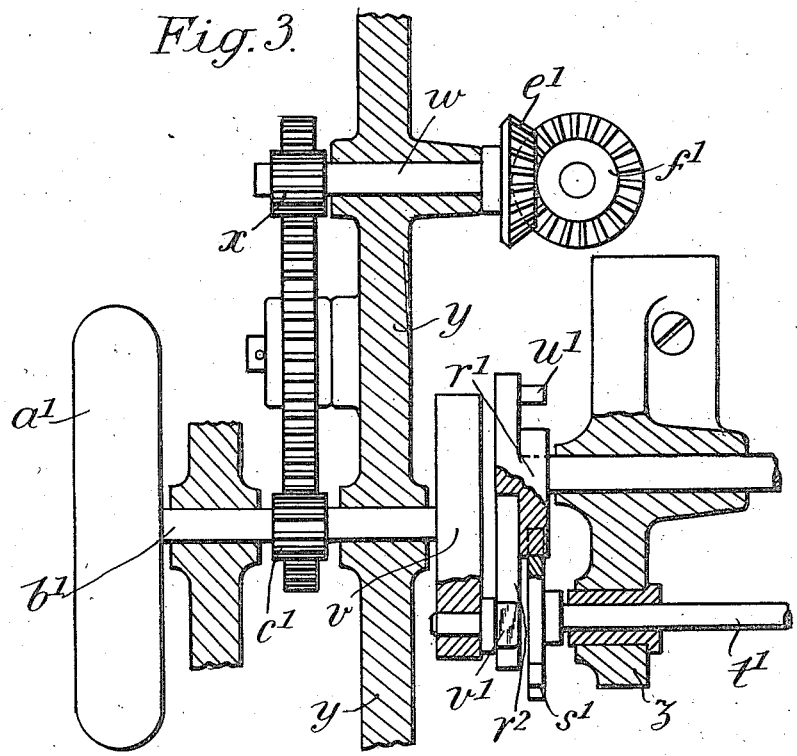
Figure 4:
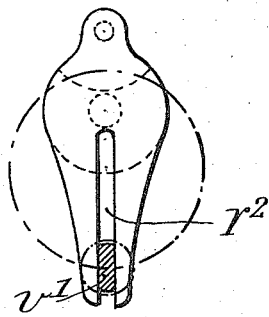

Figures 1 and 2 being sectional elevation and side elevation of one method of carrying out this invention, Figs. 3 and 4 similar views of an alternative construction. Figs. 5 and 6 are similar views of a further modification.

Referring to Figs. 1 and 2 $a$ is the fly-wheel, on the spindle $b$ of which is mounted the pinion $c$ the crank $d$ and the bevel wheel $e$, while $f$ is another bevel wheel engaging with $e$ for driving the shutter spindle. $g$ is a spindle upon which is mounted free to revolve the boss $h$, this boss carrying the gear wheel $k$ also the fixed spindles $i$ $i$ upon which rotate the bevel wheels $j$ $j$. The wheel $l$ and solid with it, the bevel wheel $m$ are also mounted free to rotate on the spindle $g$. The wheel $n$ and the lever $o$ which is solid with it are also mounted free to rotate on the spindle $g$, the lever $o$ being connected by a link $o_1$ to the crank $d$. $p$ is a spindle to which is fixed the pinion $q$ and the locking ring $r$. $s$ and $t$ are the Maltese cross and spindle which are of usual construction, the Maltese cross being actuated by the pin $u$.

Referring to Figs. 3 and 4 $a_1$ is the fly-wheel on the spindle $b_1$ on which is mounted the pinion $c_1$ and the crank disk $v$. $e_1$ is a bevel wheel mounted upon the spindle $w$ to which also is fixed the pinion $x$. The spindles $w$ and $b_1$ are journaled in the frame $y$ $y$. $r_1$ is the locking ring, $u_1$ the pin for driving the Maltese cross $s_1$, $t_1$ is the spindle of the Maltese cross $s$. These parts are journaled in the frame portion $z$. The outer portion of the locking ring $r_1$ is formed with a slot $r_2$ and a shoe or crank pin $v_1$ fits slidably into the slot $r_2$ at one end, and the other end, fits into a circular hole or recess in the crank disk $v$.

Referring to Figs. 5 and 6, $a_1$ is the fly-wheel on the spindle $b_1$ of which is mounted the pinion $c_1$ and the crank disk $v$. $e_1$ is a bevel wheel mounted upon the spindle $w$ to which also is fixed the pinion $x$.

The spindles $w$ and $b$ are journaled in the frame $y$ $y$.

3 is a slotted arm into which the shoe 2 fits slidably. This slotted arm 3 is fixed to the spindle 4 to which are also fixed the pinion 5 and the crank disk 6 which carries the dog 7.

8 is a gear wheel engaging with pinion 5 and fixed to spindle 9 to which also is fixed the film sprocket wheel 10.

The action of the apparatus is as follows: Referring to Figs. 1 and 2, the fly-wheel $a$ and with it the pinion $c$, crank $d$, bevel gears $e$ $f$ and the shutter spindle are driven at constant speed. The wheel $k$ (and with it the spindles $i$ $i$) is also rotated at constant speed by means of pinion $c$. But the wheel $n$ is oscillated to and fro by means of the crank $d$ acting through the connecting rod and the lever $o$ and thus during each revolution of the fly-wheel $a$, the bevel wheel $m$ and with it the wheel $l$, pinion $q$, spindle $p$, and locking ring $r$ are driven at a speed alternately faster and slower than the fly-wheel. The ratios of gears $c$ $k$ and gears $l$ $q$ are such that the locking ring performs one revolution in the same time as the fly-wheel $a$ and the pin $u$ is angularly located so that it is always engaging the Maltese cross $s$ when moving at its greatest speed, and as the shutter spindle is continually moving at a constant speed the shutter may be formed with 3, 4 or 5 exactly equal blades and having spaces also exactly equal to the blades. It will be seen that the amount of travel to and fro imparted to wheel $n$ may be made appropriate to the number of shutter blades per turn of the spindle $p$, the angle through which the pin $u$ travels to effect movement to the Maltese cross remaining as it should be for correct mechanical action about 90° or but slightly under.

Referring to Figs. 3 and 4, pinions $c_1$ and $x$ and with them the shutter spindle $f_1$ and fly-wheel $a_1$ and disk $v$ are driven by the gear wheel at constant speed. The locking ring $r_1$ and pin $u_1$ are driven alternately faster and slower than the fly-wheel $a_1$ by means of the shoe or crank pin $v_1$, the action of which will be seen with particular reference to Fig. 4 in which the dotted line represents the path of the shoe or pin $v_1$ traveling at constant speed. In the position shown, the locking ring $r_1$ would be moving at a lesser speed than fly-wheel $a_1$ and shutter spindle wheel $f_1$.

Referring to Figs. 5 and 6, the action is precisely the same as regards the rotation of the slotted arm 3 at cyclically varying speeds while the fly-wheel $a_2$ and shutter spindle wheel $f_2$ are moving at uniform speed. But the illustration shows the "dog" escapement instead of the "Maltese cross" form. In this case the dog roller 7 is so located on the disk 6 that its speed is rapidly increasing after the movement of commencing to move the film and rapidly decreases toward the end of film travel, whereby the movement of film may be effected during a small angular advance of the fly-wheel $a_2$ but with a relatively gentle starting and stopping.

What I claim and desire to secure by Letters Patent is:—

1. In an apparatus for the projection of animated films in combination, a film driving spindle, a second spindle having a fixed axis, mechanism associated with said spindles adapted to give the film an intermittent motion, a third spindle having a constant angular velocity, and means for driving the second spindle from the third spindle adapted to vary the angular velocity of the second spindle during a given revolution.

2. A film feed gearing comprising in combination a film driving spindle, a fly wheel spindle, a spindle intermediate the driving and fly wheel spindle, gearing of the usual Maltese cross form between the intermediate and driving spindles, and a gear between the fly wheel and intermediate spindles for giving the intermediate spindle a cyclically varying movement of rotation.

In testimony whereof I affix my signature in presence of two witnesses.

GEORGE BENNETT BOWELL.

Witnesses:
 A. WASP,
 A. PERCIVAL.